US012608463B2

(12) United States Patent
Petrov et al.

(10) Patent No.: US 12,608,463 B2
(45) Date of Patent: Apr. 21, 2026

(54) STORAGE SERVER FORSECURE AND PERFORMANT EXECUTION OF USER CODE IN A DATA CENTER STORAGE

(71) Applicant: Huawei Cloud Computing Technologies Co., Ltd., Gui'an New District (CN)

(72) Inventors: Plamen Petrov, Munich (DE); Quoc Do Le, Munich (DE); Javier Picorel, Munich (DE); Antonio Barbalace, Munich (DE); Huatao Wu, Chengdu (CN); Deping Tang, Chengdu (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 11 days.

(21) Appl. No.: 18/731,013

(22) Filed: May 31, 2024

(65) Prior Publication Data

US 2024/0403412 A1 Dec. 5, 2024

Related U.S. Application Data

(63) Continuation of application No. PCT/CN2021/135544, filed on Dec. 3, 2021.

(51) Int. Cl.
*G06F 21/53* (2013.01)
(52) U.S. Cl.
CPC ........ *G06F 21/53* (2013.01); *G06F 2221/033* (2013.01)
(58) Field of Classification Search
CPC ..... G06F 21/53; G06F 16/188; H04L 67/1097
See application file for complete search history.

(56) References Cited

U.S. PATENT DOCUMENTS 8,819,335 B1 8/2014 Salessi et al.
9,158,540 B1 10/2015 Tzelnic et al.
(Continued)

FOREIGN PATENT DOCUMENTS

WO 2020164718 A1 8/2020
WO 2020186081 A1 9/2020

OTHER PUBLICATIONS

Keeton et al., "A Case for Intelligent Disks (IDISKs)," SIGMOD Record, vol. 27, No. 3, Total 11 pages (Sep. 3, 1998).
(Continued)

*Primary Examiner* — Beemnet W Dada
(74) *Attorney, Agent, or Firm* — Leydig, Voit & Mayer, Ltd.

(57) ABSTRACT

A data center is provided which comprises one or more storage servers, and at least one of a compute server and a frontend server. A storage server for a data center is provided. The storage server is configured to obtain a data request, which is indicative of target data and a user-defined code. Instead of providing the target data to a requestor, the storage server is configured to obtain the target data and to execute the user-defined code on its own. Since the user-defined code may be malicious, the storage server is configured to execute the user-defined code in an isolated execution environment or a sandbox, such as a virtual machine or a container. In this way, data processing in the data center can be more efficient due to applying the near-data processing paradigm, while the security level can still be maintained.

20 Claims, 10 Drawing Sheets

(56) References Cited

U.S. PATENT DOCUMENTS

| | | | |
|---|---|---|---|
| 10,091,295 B1 | 10/2018 | Savic et al. | |
| 10,761,779 B2 | 9/2020 | Trika et al. | |
| 10,795,612 B2 | 10/2020 | Krasner et al. | |
| 10,802,753 B2 | 10/2020 | Kabra et al. | |
| 10,817,176 B2 | 10/2020 | Adams et al. | |
| 10,997,286 B1 | 5/2021 | Brossard et al. | |
| 11,010,350 B2 | 5/2021 | Trika et al. | |
| 11,144,359 B1 | 10/2021 | Brooker et al. | |
| 12,182,631 B2* | 12/2024 | Wang | G06F 16/2457 |
| 2009/0094258 A1 | 4/2009 | Chen et al. | |
| 2013/0191555 A1 | 7/2013 | Liu | |
| 2015/0032763 A1 | 1/2015 | Marwah et al. | |
| 2016/0092279 A1 | 3/2016 | Lee et al. | |
| 2019/0042232 A1 | 2/2019 | Trika | |
| 2019/0042501 A1 | 2/2019 | Trika | |
| 2020/0167098 A1 | 5/2020 | Shah et al. | |
| 2020/0210243 A1 | 7/2020 | Li | |
| 2021/0097083 A1 | 4/2021 | Harris et al. | |
| 2021/0303371 A1 | 9/2021 | Wang et al. | |

OTHER PUBLICATIONS

Acharya et al., "Active disks: programming model, algorithms and evaluation," ACM SIGOPS Operating Systems Review, vol. 32, Issue 5, Total 11 pages (Dec. 1998).
Riedel et al., "Active Storage for Large-Scale Data Mining and Multimedia," In Proceedings of the 24th International Conference on Very Large Data Bases (VLDB '98), Morgan Kaufmann Publishers Inc., San Francisco, CA, USA, Total 12 pages (1998).
Kreybig et al., "An intelligent disk controller—a processor system for file management and query functions," Microprocessing and Microprogramming 25, Total 6 pages (Jan. 1989).
Gu et al., "Biscuit: a Framework for Near-Data Processing of Big Data Workloads," 2016 ACM/IEEE 43rd Annual International Symposium on Computer Architecture (ISCA), Seoul, Korea (South), doi: 10.1109/ISCA.2016.23, Total 13 pages (Jun. 2016).
Barbalace et al., "blockNDP: Block-storage Near Data Processing," Middleware '20 Industrial Track, doi: 10.1145/3429357.3430519, Total 8 pages (Dec. 2020).
Barbalace et al., "Computational Storage: Where Are We Today?," Paper presented at 11th Annual Conference on Innovative Data Systems Research (CIDR '21) 2021, Virtual Conference, Total 6 pages (2021).
Do et al., "Cost-effective, Energy-efficient, and Scalable Storage Computing for Large-scale AI Applications," ACM Transactions on Storage, vol. 16, No. 4, Article 21, https://doi.org/10.1145/3415580, Total 37 pages (Oct. 12, 2020).

Sampe et al., "Data-driven serverless functions for object storage," In Proceedings of the 18th ACM/IFIP/USENIX Middleware Conference (Middleware '17), Association for Computing Machinery, New York, NY, USA, https://doi.org/10.1145/3135974.3135980, Total 13 pages (Dec. 2017).
Cao et al., "POLARDB Meets Computational Storage: Efficiently Support Analytical Workloads in Cloud-Native Relational Database," 18th USENIX Conference on File and Storage Technologies, Total 15 pages (Feb. 2020).
Woods et al., "Ibex—an Intelligent Storage Engine with Support for Advanced SQL Off-loading," Proceedings of the VLDB Endowment vol. 7, No. 11, Total 12 pages (Jul. 1, 2014).
Bae et al., "Intelligent SSD: a turbo for big data mining," International Conference on Information and Knowledge Management, Proceedings, 10.1145/2505515.2507847, Total 4 pages (Oct. 2013).
Li et al., "LeapIO: Efficient and Portable Virtual NVMe Storage on ARM SoCs," In Proceedings of the Twenty-Fifth International Conference on Architectural Support for Programming Languages and Operating Systems (ASPLOS '20), Association for Computing Machinery, New York, NY, USA, https://doi.org/10.1145/3373376.3378531, Total 15 pages, (Mar. 2020).
De et al., "Minerva: Accelerating Data Analysis in Next-Generation SSDs," 2013 IEEE 21st Annual International Symposium on Field-Programmable Custom Computing Machines, Seattle, WA, USA, doi: 10.1109/FCCM.2013.46, Total 8 pages (Apr. 28-30, 2013).
Cao et al., "PolarDB Serverless: a Cloud Native Database for Disaggregated Data Centers," Proceedings of the 2021 International Conference on Management of Data, SIGMOD '21, Total 13 pages (Jun. 20-25, 2021).
Do et., "Programmable solid-state storage in future cloud datacenters," Communications of the ACM vol. 62, No. 6, https://doi.org/10.1145/3286588, Total 9 pages (Jun. 2019).
Yu et al., "PushdownDB: Accelerating a DBMS Using S3 Computation," 2020 IEEE 36th International Conference on Data Engineering (ICDE), Dallas, TX, USA, doi: 10.1109/ICDE48307.2020.00174, Total 4 pages (Apr. 2020).
Do et al., "Query processing on smart SSDs: opportunities and challenges," IEEE, SIGMOD Conference on Management and Data, Total 10 pages (Jun. 22, 2013).
Koo et al., "Summarizer: Trading Communication with Computing Near Storage," 2017 50th Annual IEEE/ACM International Symposium on Microarchitecture (MICRO), Boston, MA, USA, Total 13 pages, (Oct. 14-18, 2017).
Fitch, "Blue Gene Active Storage for High Performance BG/Q I/O and Scalable Data-centric Analytics," 2013 IBM Corporation, Total 24 pages (Jan. 17, 2013).

* cited by examiner

800

801 obtaining a data request indicative of target data and a user-defined code 802 obtaining the target data 803 executing the user-defined code in an isolated execution environment 804 obtaining a result of executing the user-defined code

900

901   providing a data request to a storage server 902   obtaining, by the storage server, the data request 903   obtaining, by the storage server, the target data 904   executing, by the storage server, the user-defined code in an isolated execution environment 905   obtaining, by the at least one storage server, a result of executing the user-defined code

STORAGE SERVER FORSECURE AND PERFORMANT EXECUTION OF USER CODE IN A DATA CENTER STORAGE

CROSS-REFERENCE TO RELATED APPLICATIONS

This application is a continuation of International Application No. PCT/CN2021/135544, filed on Dec. 3, 2021, the disclosure of which is hereby incorporated by reference in its entirety.

TECHNICAL FIELD

Embodiments of the present disclosure generally relate to the field of computer science, and in this field to data center storage. Embodiments of the present disclosure are further related to a storage server for a data center, a system comprising at least one storage server, and a method for the system.

BACKGROUND

A data center may be adapted to provide shared access to applications and data by using a complex infrastructure comprising a network, compute servers, and storage servers. The data center is often used in the information and communications technology (ICT) industry, such as by enterprises, Internet content providers, telecommunication operators. The security of the data center is crucial for service continuity and data security.

Normally, the storage servers in the data center run storage software that is secure and trusted, while the compute servers in the data center run a mixture of provider-provided software and user-provided software. In some application scenarios, such user-provided software (also referred to as "user-defined code") is uploaded to the data center and is executed by the compute servers in the data center, in order to provide a flexible and customizable service to the user or customer. However, the user-defined code cannot be deemed secure and trusted.

SUMMARY

The present disclosure is further based on the following considerations.

Executing the user-defined code by the compute serves in the data center may in some cases also consume a considerable amount of time and bandwidth, for example, caused by copying and transferring data between the compute servers and storage serves of the data center. Especially, when a large amount of data is involved by the user-defined code. This can result in a significant bottleneck for the performance of the data center.

Executing the user-defined code can also be a security risk. This is because there are normally no restrictions on the programming language the user-defined code is written. The user may execute insecure or malicious code into the data center, e.g., onto the compute servers where the user-defined code is executed.

In addition, because the data center is normally configured to execute user-defined codes of multiple users and/or store data belonging to multiple users, it is possible that the data may leak from one user to the other, which may cause a security breach.

In view of the above, an objective of this disclosure is to increase the performance and data security of a data center.

This and other objectives are achieved by the solutions of the present disclosure, as described in the independent claims. Advantageous implementations are further defined in the dependent claims.

An idea described in the present disclosure is to allow user-defined code to be executed in an isolated execution environment of a storage server for a data center. To reduce overhead introduced by the isolated execution environment, a shared memory means may be optionally used.

A first aspect of the present disclosure provides a storage server for a data center. The storage server is configured to obtain a data request, in which the data request is indicative of target data and a user-defined code. Then, the storage server is configured to obtain the target data by using a storage software of the storage server. Further, the storage server is configured to execute the user-defined code in an isolated execution environment using the target data as an input, in which the isolated execution environment is separated from the storage software. Then, the storage server is configured to obtain a result of executing the user-defined code as an output related to the data request.

Optionally, the result of executing the user-defined code may be sent back to the requester of the data request. Optionally, after receiving the data request, the storage server may be further configured to obtain the user-defined code based on the data request. Optionally, the data request may comprise a first part that is indicative of the target data, and a second part that is indicative of the user-defined code. The first part may comprise a storage location of the target data. The second part may comprise the user-defined code. In this case, the storage server may be configured to obtain the user-defined code from the data request directly and provide the user-defined code to the isolated execution environment. Alternatively, the second part may comprise or indicate a storage location of the user-defined code. In this case, the storage server may be configured to obtain the user-defined code from the storage location and provide the user-defined code to the isolated execution environment. The user-defined code may be an executable file or object. The executable file or object may be of any form, such as an archive file, an executable binary, executable instructions, and the like. The user-defined code may be provided by a user and/or may be generated by user software. The storage location may be represented by a path or a link, according to which a target (the target data or the user-defined code) may be accessed.

Optionally, the storage server may be a blade server adapted to store (user) data.

Optionally, the storage server may be configured to host an operating system. The storage server may be configured to run the storage software based on (or above) the operating system. Optionally, the storage software may be integrated with the operating system. The user-defined code may not be part of or integrated with the operating system.

The isolated execution environment for executing the user-defined code may be user dedicated. For example, the storage server may be adapted to create a dedicated and isolated execution environment corresponding to each user. Additionally or alternatively, the isolated execution environment may be application dedicated. For example, the storage server may be adapted to create a dedicated execution environment corresponding to each application (e.g., user software).

An advantage of executing the user-defined code by the storage server is a faster execution time (or runtime) and a lower network utilization of the data center. Executing the user-defined code by the storage server may enable "near-data processing" (NDP) compute paradigm, in which a code is executed as close as possible to its storage location. A further effect is that in the data center, a network utilization may be optimized because there is no need to transfer the target data between the storage server and, for instance, a conventional compute server. This is especially beneficial when the target data is relatively large (for example, size of gigabytes (GBs) or more).

Moreover, the user-defined code may be executed securely on the storage server in order to avoid data leakage and being compromised. The NDP may impose a security risk because malicious code comprised in the user-defined software may be executed on the storage server. However, by executing the user-defined code in the isolated execution environment, this risk may be significantly reduced. Further, the user may be able to execute the user-defined code written in any programming language.

In a possible implementation form of the first aspect, for executing the user-defined code, the storage server may be configured to:

determine one or more idle processors of the storage server; and execute the user-defined code by using the one or more idle processors.

The one or more idle processors may be one or more processing units, which may comprise one or more of the following components which may be comprised in the storage server: a smart network interface controller (smartNIC), an accelerator card, a central processing unit (CPU), a graphics processing unit (GPU), a neural processing unit (NPU), a field-programmable gate array (FPGA).

In a possible implementation form of the first aspect, before determining the one or more idle processors, the storage server may be configured to store the data request in a queue. During or after determining the one or more idle processors, the storage server may be configured to pick up (or retrieve) the data request from the queue. Then, the storage server may be configured to pass the retrieved data request to the storage software for processing.

The storage server may be configured to store one or more further data requests in the queue. The storage server may be configured to determine to retrieve the data request from the queue based on one or more of the following conditions:

whether there is any processor available;

whether the available processor has enough resources such as processor cycles to execute the data request; and whether executing the data request conflicts with executions of other running data requests.

Optionally, the queue may be based on any data structure, such as a list, double-linked list, and tree. The queue may be configured to implement insertion and/or deletion algorithms.

An advantage of using the queue to store the data request is a reduced denial of services. Moreover, the queue may help to introduce performance isolation for data requests that are already running, thus maintaining a promised service level agreement.

In a possible implementation form of the first aspect, the storage server may be further configured to employ a shared memory interprocess communication mechanism to enable communication between the storage software and the user-defined code executed in the isolated execution environment. To this end, the storage software may be configured to:

store the obtained target data into a first shared memory area; and obtain the result of executing the user-defined code from a second shared memory area.

Optionally, the user-defined code may be adapted to retrieve the target data from the first shared memory area, and store the result of executing the user-defined code into the second share memory area.

The shared memory interprocess communication mechanism may be initiated and maintained by the storage server, preferably through related software means such as but not limited to transparent page sharing. Optionally, the first and the second shared memory areas may be allocated by the storage server in a computer memory comprised in the storage server. The first and second shared memory areas may be used to share data between the storage software and the user-defined code.

An advantage of using the shared memory interprocess communication mechanism is a reduced overhead of data transfer between components of the storage server. In fact, operations such as a data transfer inside the storage server may be avoided. Thus, a faster data processing speed may be achieved.

In a possible implementation form of the first aspect, the first shared memory area may comprise an input buffer, and the second shared memory area may comprise an output buffer. The input buffer may be configured to be read-only, and the output buffer may be configured to be write-only.

The input buffer may be used to store the target data by the storage software, and the output buffer may be used to store the result of executing the user-defined code by the user-defined code. In this way, the data security of the storage server, and the data center security may be further improved.

In a possible implementation form of the first aspect, the storage server may further comprise one or more support components. Each support component may be associated with the isolated execution environment and may comprise at least one of an operating system, a runtime system, and a library that is adapted to support the execution of the user-defined code.

Each support component may be comprised in the isolated execution environment or may be available to the isolated execution environment. Optionally, the one or more support components may be stored on the storage server.

Optionally, after receiving the data request, the storage server may be further configured to determine one or more suitable support components to facilitate the execution of the user-defined code in the isolated execution environment, e.g., according to the type of the user-defined code. Then, the storage server may be further configured to retrieve and provide the one or more determined support components to the isolated execution environment.

In this way, the data processing speed may be further increased.

In a possible implementation form of the first aspect, the storage server may be further configured to create a checkpoint or an image of the isolated execution environment.

In this way, a boot-up time may be reduced and the data processing speed may be further increased.

In a possible implementation form of the first aspect, the isolated execution environment may be based on a virtual machine or container.

The virtual machine may refer to the virtualization of a computer system. It is noted that the virtual machine may comprise virtualized hardware based on the hardware of the storage server. The isolated execution environment may be created and maintained through one or more virtual machine instances.

The container may refer to a unit of software that packages up code and all its dependencies, optionally at an operating system level.

Generally, the virtual machine and the container may be both considered as virtualization technology. Alternatively, any other means in the virtualization technology may be used by the storage server to create and maintain the isolated execution environment.

A second aspect of the present disclosure provides a system comprising at least one storage server according to the first aspect or any implementation form thereof and at least one of a compute server and a frontend server. The at least one of the compute server and the frontend server is configured to provide the data request to the at least one storage server.

In an implementation form of the second aspect, the system may comprise at least one frontend server configured to:

obtain the data request from outside of the system; and forward the data request to the at least one storage server.

Optionally, the at least one frontend server may be configured to function as a proxy in order to gather the data request from outside of the system.

In an implementation form of the second aspect, the system may comprise at least one compute server configured to:

generate the data request; and forward the data request to the at least one storage server.

Optionally, the at least one compute server may be a blade server adapted to run user-defined software. The user-defined software may be configured to generate the data request.

In an implementation form of the second aspect, the at least one of the compute server and the frontend server may be configured to:

monitor a status of each storage server; and provide the data request to a storage server selected based on the monitored status.

The selection of the storage server may be further based on the data request, including the type of the user-defined code.

In an implementation form of the second aspect, the at least one of the compute server and the frontend server may be further configured to:

split the data request into a plurality of sub-requests, and provide the plurality of sub-requests to one or more storage servers of the at least one storage server selected based on the monitored status.

Each sub-request may be seen as a single data request. The plurality of sub-requests may together be used to complete a common task.

In this way, a single task may be split into a plurality of sub-tasks that may be handled in a distributed manner. Hence, parallelism may be achieved, and the efficiency of data processing may be increased.

A third aspect of the present disclosure provides a method executed by a storage server for a data center. The method comprises the following steps:

obtaining a data request, wherein the data request is indicative of target data and a user-defined code;

obtaining the target data by using a storage software of the storage server;

executing the user-defined code in an isolated execution environment using the target data as an input, wherein the execution environment is separated from the storage software; and obtaining a result of executing the user-defined code as an output related to the data request.

In a possible implementation form of the third aspect, the step of executing the user-defined code may comprise:

determining one or more idle processors of the storage server; and executing the user-defined code by using the one or more idle processors.

In a possible implementation form of the third aspect, before determining the one or more idle processors, the method may further comprise storing the data request in a queue. During or after determining the one or more idle processors, the data request is picked up from the queue.

In a possible implementation form of the third aspect, the method may further comprise using a shared memory inter-process communication mechanism to communicate between the storage software and the user-defined code executed in the isolated execution environment. The method may further comprise:

storing, by the storage software, the obtained target data into a first shared memory area; and obtaining, by the storage software, the result of executing the user-defined code from a second shared memory area.

In a possible implementation form of the third aspect, the first shared memory area may comprise an input buffer, and the second shared memory area may comprise an output buffer. The input buffer may be configured to be read-only, and the output buffer may be configured to be write-only.

In a possible implementation form of the third aspect, the storage server may further comprise one or more support components. Each support component may be associated with the isolated execution environment and comprises at least one of an operating system, a runtime system, and a library that is adapted to support the execution of the user-defined code.

In a possible implementation form of the third aspect, the method may further comprise creating a checkpoint or an image of the isolated execution environment.

In a possible implementation form of the third aspect, the isolated execution environment may be based on a virtual machine or container.

The method of the third aspect and its implementation forms provide the same advantages as described above for the storage server of the first aspect.

A fourth aspect of the present disclosure provides a method for a system. The system comprises at least one storage server and at least one of a compute server and a frontend server. The at least one of the compute server and the frontend server is connected to the at least one storage server. The method comprises the following steps:

providing, by the at least one of a compute server or a frontend server, a data request to the at least one storage server;

obtaining, by the at least one storage server, the data request, wherein the data request is indicative of target data and a user-defined code;

obtaining, by the at least one storage server, the target data by using a storage software of the at least one storage server;

executing, by the at least one storage server, the user-defined code in an isolated execution environment using the target data as an input, wherein the execution environment is separated from the storage software; and obtaining, by the at least one storage server, a result of executing the user-defined code as an output related to the data request.

In an implementation form of the fourth aspect, the step of providing the data request to the at least one storage server may comprise:

obtaining, by the at least one frontend server, the data request from outside of the system; and forward, by the at least one frontend server, the data request to the at least one storage server.

In an implementation form of the fourth aspect, the step of providing the data request to the at least one storage server may comprise:

generating, by the at least one compute server, the data request; and forwarding, by the at least one compute server, the data request to the at least one storage server.

In an implementation form of the fourth aspect, the method may further comprise:

monitoring, by the at least one of the compute server and the frontend server, a status of each storage server; and providing, by the at least one of the compute server and the frontend server, the data request to a storage server selected based on the monitored status.

In an implementation form of the fourth aspect, the method may further comprise:

splitting, by the at least one of the compute server and the frontend server, the data request into a plurality of sub-requests, and providing, by the at least one of the compute server and the frontend server, the plurality of sub-requests to one or more storage servers of the at least one storage server selected based on the monitored status.

The method of the fourth aspect and its implementation forms provide the same advantages as described above for the system of the first aspect.

A fifth aspect of the present disclosure provides a computer program comprising a program code for performing the method according to the third aspect or any implementation form thereof, when executed on a computer.

A sixth aspect of the present disclosure provides a computer program comprising a program code for performing the method according to the fourth aspect or any implementation form thereof, when executed on a plurality of computers.

A seventh aspect of the present disclosure provides a computer-readable medium comprising instructions which, when executed by a computer, cause the computer to carry out the method according to any one of the third aspect or any implementation form thereof.

An eighth aspect of the present disclosure provides a computer-readable medium comprising instructions which, when executed by a plurality of computers, cause the computers to carry out the method according to any one of the fourth aspect or any implementation form thereof.

A ninth aspect of the present disclosure provides a chipset comprising instructions which, when executed by the chipset, cause the chipset to carry out the method according to any one of the third aspect or any implementation form thereof.

A tenth aspect of the present disclosure provides a plurality of chipsets, each comprising instructions which, when executed by the chipsets, cause the chipsets to carry out the method according to any one of the fourth aspect or any implementation form thereof.

It has to be noted that all apparatus, devices, elements, units, and means described in the present application could be implemented in software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity, which performs that specific step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms will be explained in the following description of specific embodiments in relation to the enclosed drawings, in which.

DETAILED DESCRIPTION OF EMBODIMENTS

In the FIGS. 1-10, corresponding elements may be labelled with the same reference signs, may share the same features, and may function likewise. Moreover, it is noted that the number of elements depicted in the FIGS. 1-10 are for illustration purposes only, and shall not be interpreted as limitations to embodiments of the present disclosure.

The present disclosure relates generally to a data center. The data center may refer to a distributed system adapted to provide at least storage services. The distributed system may comprise networked computers, storage systems and controllers for processing, storing and disseminating data, optionally in a large scale (e.g., in the petabyte (PB) scale, such as more than hundreds of PBs). For example, an enterprise may use one or more data centers for maintaining databases and realizing customer relationship management. A media streaming service provider may use one or more data centers for storing and distributing its contents to a large amount of end users. A data center may comprise power supply, routers, switches, firewalls, storage systems, servers, and controllers, etc.

Figure 1B:
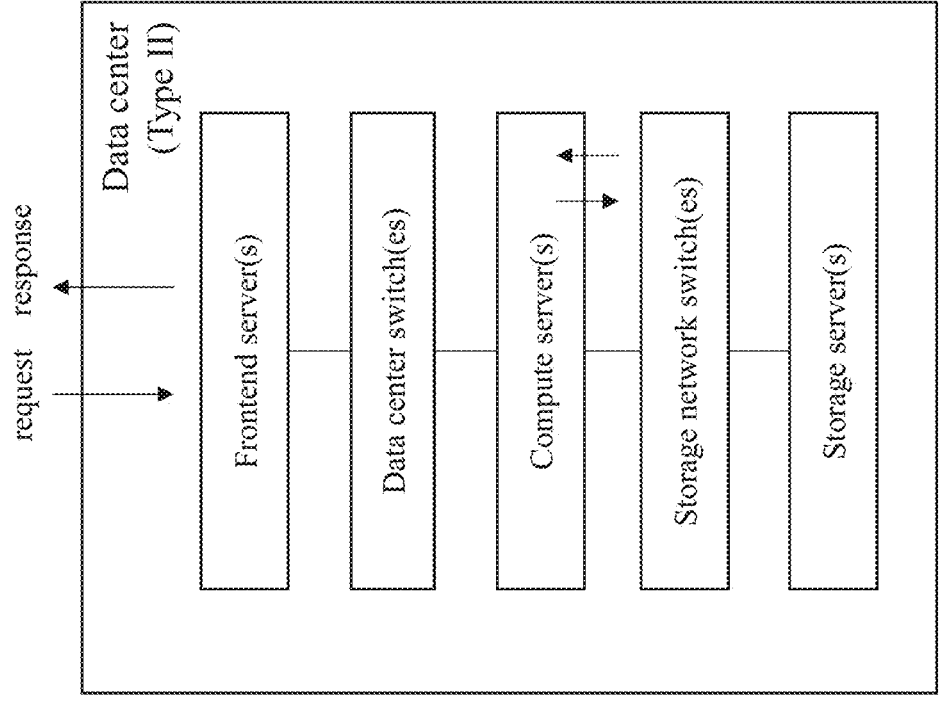
FIG. 1B shows another data center with a dedicated storage network.
Figure 1A:
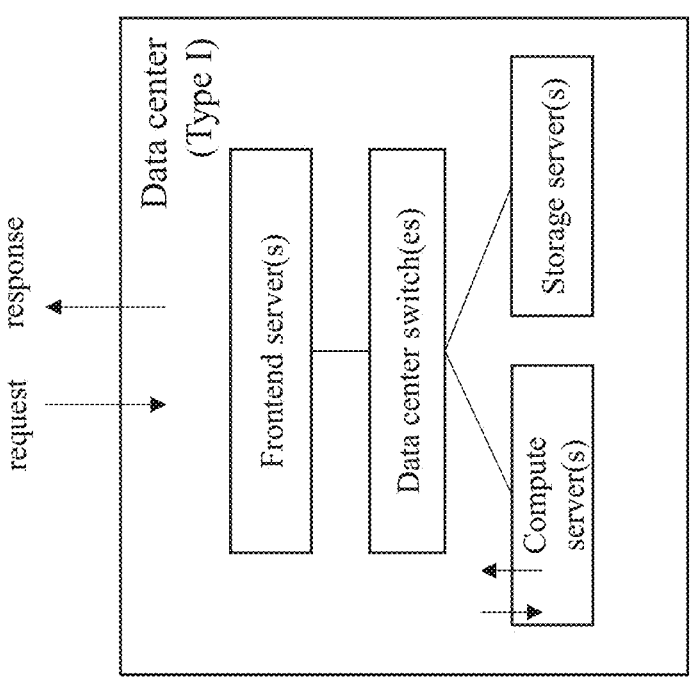
FIG. 1A shows a data center without a dedicated storage network.

FIG. 1A shows an example of a data center without a dedicated storage network. The data center comprises one or more frontend servers, one or more data center switches, one or more compute servers, and one or more storage servers.

FIG. 1B shows another example of a data center with a dedicated storage network. The data center comprises one or more frontend servers, one or more data center switches, one or more compute servers, one or more storage network switches, and one or more storage servers. The one or more storage network switches and one or more storage servers form the dedicated storage network.

In the data center of both types shown in FIGS. 1A and 1B, a request may be from outside of the data center. Alternatively, the request may be from inside of the data center, such as from the compute server(s) where user software may be deployed. The request may be a data storage request, a data retrieving request, or a data processing request, or a combination of both. The request may be referred to as the data request in embodiments of the present disclosure. It is noted that the two types of data center depicted in FIGS. 1A and 1B are non-exhaustive.

The elements in FIGS. 1A and 1B are merely for illustrating possible architectures of the data center. Not every element in FIGS. 1A and 1B is essential for the present disclosure. For example, the present disclosure may also be applied to a data center like in FIGS. 1A and 1B but without frontend servers or compute servers.

In the present disclosure, the compute servers may also be referred to as compute nodes, and the storage servers may also be referred to as storage nodes. A possible data center in the present disclosure may refer to a data center with disaggregated compute and storage nodes. The compute servers for the data center may be servers adapted to perform data computation/processing, such as processing batch jobs and executing user software. The compute servers may be configured to process incoming requests from users or applications. For example, the compute servers may be configured to execute users' software. The storage servers for the data center may be servers adapted to store and retrieve data, such as user data.

It is noted that roles of the compute servers and the storage servers cannot be swapped without major functional issues in the data center, particularly in a data center with disaggregated compute and storage servers. For example, a compute server cannot be adapted to function as a storage server, and vice versa. This is because hardware configurations of the compute server and the storage server may be distinct: the processor(s) of the compute server may be much more powerful than that of the storage server; the storage capacity of the storage server may be much larger than (e.g., ten or more times larger than) that of the compute server; and the random-access memory (RAM) of the compute server may be larger than that of the storage server. For example, the compute servers and the storage servers may be blade servers with distinct configurations.

A data center may comprise a plurality of frontend servers, compute servers, and storage servers. The plurality of servers may be arranged into one or more racks of the data center.

Optionally, the plurality of storage servers may form a storage cluster, and may be organized either in a flat manner or hierarchically. In a flat storage cluster, the storage servers may be equal in terms of handling data requests, and a data request may arrive at any one of them. In a hierarchical storage cluster, the storage servers may be organized in levels, and a storage request may be passed along level by level until the target data is located. Optionally, the lowest level in the hierarchical storage cluster may be used to hold data. Similarly, the plurality of frontend servers and compute servers may form a frontend cluster and a compute cluster, respectively.

As shown in FIGS. 1A and 1B, a typical operation in the data center for the present disclosure may include a compute node receiving a request, obtaining necessary data from a storage node, processing the obtained data according to the request, and sending the processed or updated data back to the storage node for storage. Optionally or additionally, a response may be sent to the request originator. Such a process can involve data being passed between the compute server and the storage server multiple times. Sometimes only a small amount of the passed data may be actually needed. Moving large amounts of data can consume considerable amounts of time and bandwidth, and can become a significant bottleneck for performance improvement in the data center.

Figure 2:
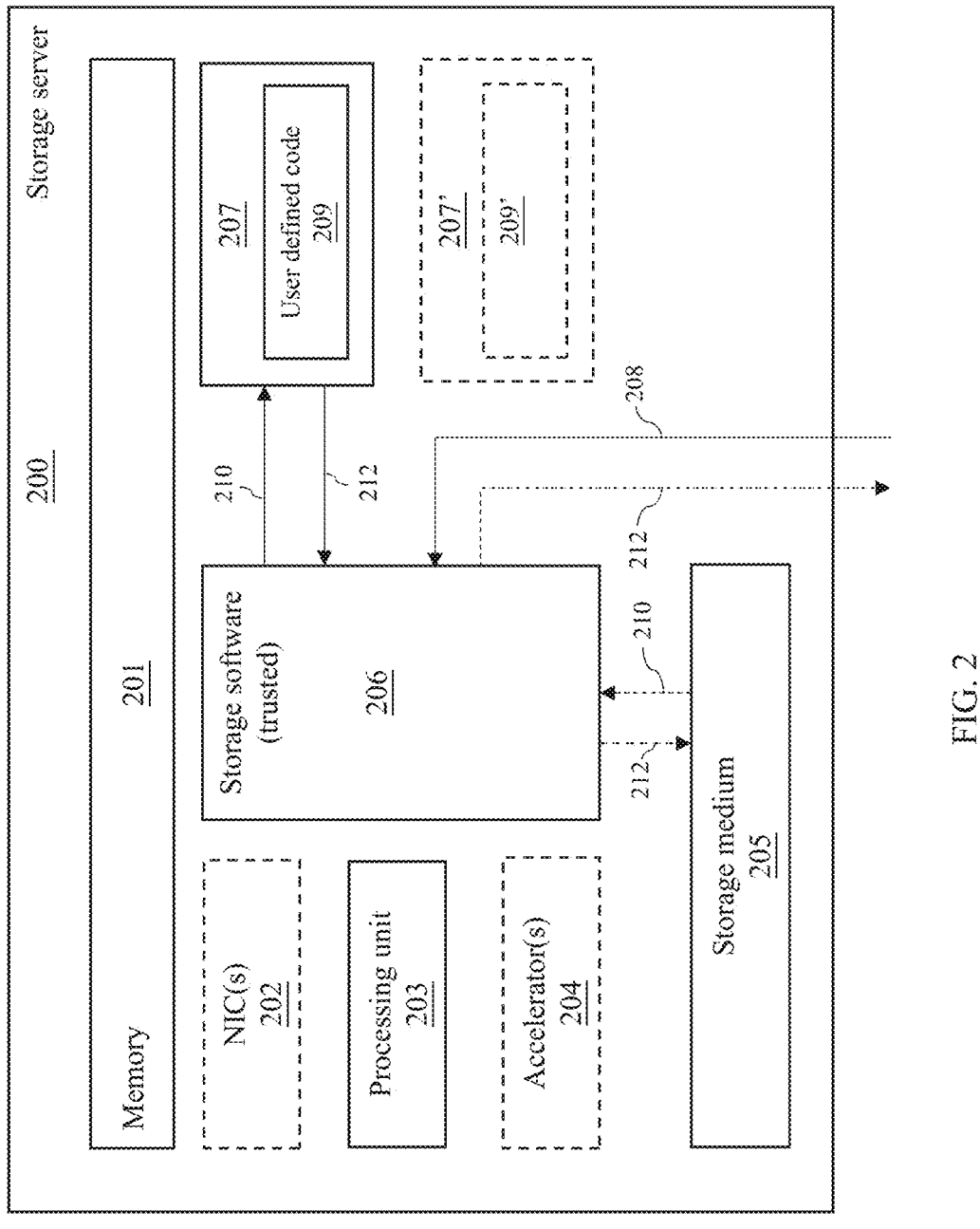
FIG. 2 shows a storage server according to the present disclosure.

FIG. 2 shows an example of a storage server 200 according to the present disclosure. The storage server 200 is suitable for being used in a data center depicted in FIG. 1A or 1B. The storage server 200 is configured to receive a data request 208. Optionally, the data request may be from a compute node or a frontend server, or may be originated from outside of the data center. It is not essential for the storage server 200 to know from where the data request is received.

The data request 208 is indicative of target data 210 and of a user-defined code 209. Optionally, the data request 208 may be seen as a near-data processing request. Optionally, the data request 208 may comprise at least two parts. A first part may comprise an identifier of the target data 210, and a second part may comprise an embedded user-defined code or an identifier of the user-defined code 209. Optionally, the identifier of the target data 210 may comprise a link (e.g., a URL), a path, or a reference to the target data 210. The target data 210 may comprise one or more objects (or files). The identifier of the user-defined code 209 may comprise a link (e.g., a URL), a path, or a reference to the user-defined code 209. For example, the user-defined code 209 may be any one of the following:

source-code written in any programming language;

byte-code, intermediate-representation (IR), or intermediate language (IL), such as Java bytecode, or LLVM IR, or .NET IL; and binary executables and libraries, e.g., a machine code.

Optionally, the user-defined code 209 may be provided in a compressed and/or encoded form, and may further comprise software components such as multimedia, configuration, and script files.

The storage server 200 is further configured to obtain the target data 210 by using a storage software 206 of the storage server 200 according to the data request 208. Optionally, the target data 210 may be retrieved from a storage medium 205 of the storage server 200. The storage medium 205 may comprise, for example, a hard disk (HDD), solid-state drive (SSD), and a tape. The storage medium 205 may be organized in a form of disk array.

Optionally, the storage server 200 may be configured to host an operating system above which the storage software 206 is running. Optionally, the storage software 206 may be integrated with the operating system. Therefore, the storage software 206 may be considered as a trusted software for the storage server 200, whereas the user-defined code 209 may be considered to be untrusted for the storage server 200.

Optionally, the storage server 200 may be further configured to communicate with a load balancer (not shown in FIG. 2). Before the data request 208 is received by the storage server 200, the load balancer may be configured to check whether the storage server 200 is capable or suitable to handle the data request 208. For example, the load balancer may be configured to collect a current status of the storage server 200, and may be configured to make a decision based on the current status, wherein the status may be a load level of the storage server 200. Another status may include a power consumption, users' credentials, etc. The load balancer may be configured to collect more than one such current status. Optionally, the load balancer may be further configured to share the collected status (or more than one status) with other storage servers, in case that multiple storage servers exist in the data center. In this case, a plurality of load balancers may be configured to coordinate to maintain a cohesive state of more than one status, such as load, power, caching, users, etc . . . of the multiple storage servers. Optionally, the load balancer may be a server adapted to perform the functions mentioned above.

Optionally, the load balancer may be configured to split a data request into a plurality of sub-requests. Then, the load balancer may be configured to provide the sub-requests to the storage server 200, or to other storage servers comprised in the data center if there are any. It is noted that in this case, the data request 208 in FIG. 2 may be seen as one of the plurality of sub-requests. In this way, a complicated task may be disassembled into a plurality of sub-tasks, which can be handled more efficiently by the storage server 200 and/or by other storage servers with limited processing capability.

By using the optional load balancer, the storage server 200 may be less likely to overload by excessive loads. Therefore, the data center can be more robust against denial-of-service (DoS) attacks. Hence, the security level of the data center can be further increased.

Then, the storage server 200 is configured to execute the user-defined code 209 in an isolated execution environment 207 using the target data 210 as an input. The isolated execution environment 207 is separated from the storage software 206.

Optionally, the isolated execution environment 207 being separate from the storage software 206 may be understood as that operations executed inside the isolated execution environment 207 do not produce any effect on entities outside of the isolated execution environment 207, especially not on the operations run by the storage software 206.

Optionally, before executing the user-defined code 209, the storage server 200 may be configured to determine one or more idle processors of the storage server. After determining that there are one or more idle processors, the storage server 200 may be configured to execute the user-defined code using the one or more idle processors. Optionally, an idle processor may be a processing unit having enough cycles to execute the user-defined code 209 and related software for creating and maintaining the isolated execution environment 207. Optionally, the processing unit may be a central processing unit (CPU), a special-purpose processor, a processor hosted on a smart network interface card (Smart-NIC), graphic processing unit (GPU), neural processing unit (NPU), field-programmable gate array (FGPA), or application specific integrated circuit (ASIC).

Optionally, for executing the user-defined code 209, the storage server 200 may be configured to obtain the user-defined code 209 according to the data request 208, and instantiate the obtained user-defined code 209 into the isolated execution environment 207.

Optionally, the isolated execution environment 207 may be a sandbox, and may be achieved by computer virtualization technology. For example, the isolated execution environment 207 may be based on a virtual machine, or may be based on a container. The virtual machine or the container may be configured to provide a dedicated execution environment for a particular application or software. Further, the storage server 200 may be configured to run (for example, create and maintain) the isolated execution environment 207 using a processing unit as mentioned above.

Optionally, the storage server 200 may be configured to create one or more checkpoints or images of the isolated execution environment 207. In this way, the isolated execution environment 207 may be started or restarted from the one or more checkpoints or images. This may help to reduce the boot time of the isolated execution environment 207, and may further increase the data processing speed.

Optionally, the storage server 200 may be configured to employ a plurality of isolated execution environments 207, 207'. The plurality of isolated execution environments 207, 207' may be user dedicated or code dedicated. For a user dedicated execution environment 207, the storage server 200 may be configured to allocate a dedicated isolated execution environment for each user. For a code dedicated execution environment 207, the storage server 200 may be configured to allocate a dedicated isolated execution environment for each kind of code. For example, the storage server 200 may allocate three sandboxes for executing Java bytecode, LLVM IR, and .NET IL, respectively.

The storage server 200 is further configured to obtain a result 212 of executing the user-defined code as an output related to the data request. The result 212 may be optionally stored into the storage server 200, e.g . . . into the storage media 205.

By executing the user-defined code on the storage server, operations such as data copying, moving, transferring, filtering, aggregation and statistic, which normally require data transfer between servers of the data center can be efficiently executed. Because the data transfer between servers of the data center can be avoided or at least reduced. User-defined code 209 may be executed near the storage location of the target data 210. In this way, data processing speed may be accelerated, network resources of the data center may be more efficiently utilized, and the performance of the data center can be improved by the storage server 200.

It is noted that any suitable means commonly known in the field may be used to determine to which storage server the data request shall be sent. For example, when there is only one storage server, then the data request is sent to this storage server. When there are multiple storage servers, then the frontend server or the compute server may be configured to determine a storage server based on the data request 208. Alternatively, as exemplarily depicted in FIG. 1B, a storage network switch may be configured to determine a storage server based on the data request 208. Nevertheless, this is neither essential nor relevant for the storage server 200. As long as the storage server 200 receives the data request 208, it is fully capable of processing the data request 208, irrelevant of where and how the data request 208 is received.

By executing the user-defined code in the isolated execution environment 207, the security risk imposed by the user-defined code may be mitigated. Therefore, the security level of the data center can be maintained or improved.

FIG. 2 also depicts some optional and exemplary hardware units that the storage server 200 may comprise. For example, the storage server may include at least one of a memory 201, a processing unit 203, and a storage medium 205. The processing unit 203 may be configured to execute the functions as mentioned above for the storage server 200, including but not limited to running the storage software 206, creating and maintaining the isolated execution environment 207, and handling the data request 208. The memory 201 may be a random access memory (RAM), and may be configured to store or cache data temporarily. The storage medium 205 may be configured to store data including the target data 210 for the data center. The memory 201, the processing unit 203, and the storage medium 205 may be connected via a bus or a hierarchy of buses (not shown in FIG. 2).

Optionally, the storage medium 205 may be connected by any suitable computer storage interface. The computer storage interface may comprise one or more of the following: peripheral component interconnect (PCI) including PCIe and PCI-X, advanced host controller interface (AHCI), serial advanced technology attachment (SATA) interface, SATA Express, universal serial bus (USB), U.2 (formerly known as SFF-8639), M.2 (formerly known as Next Generation Form Factor, NGFF), non-volatile memory express (NVMe) and the like.

Figure 3:
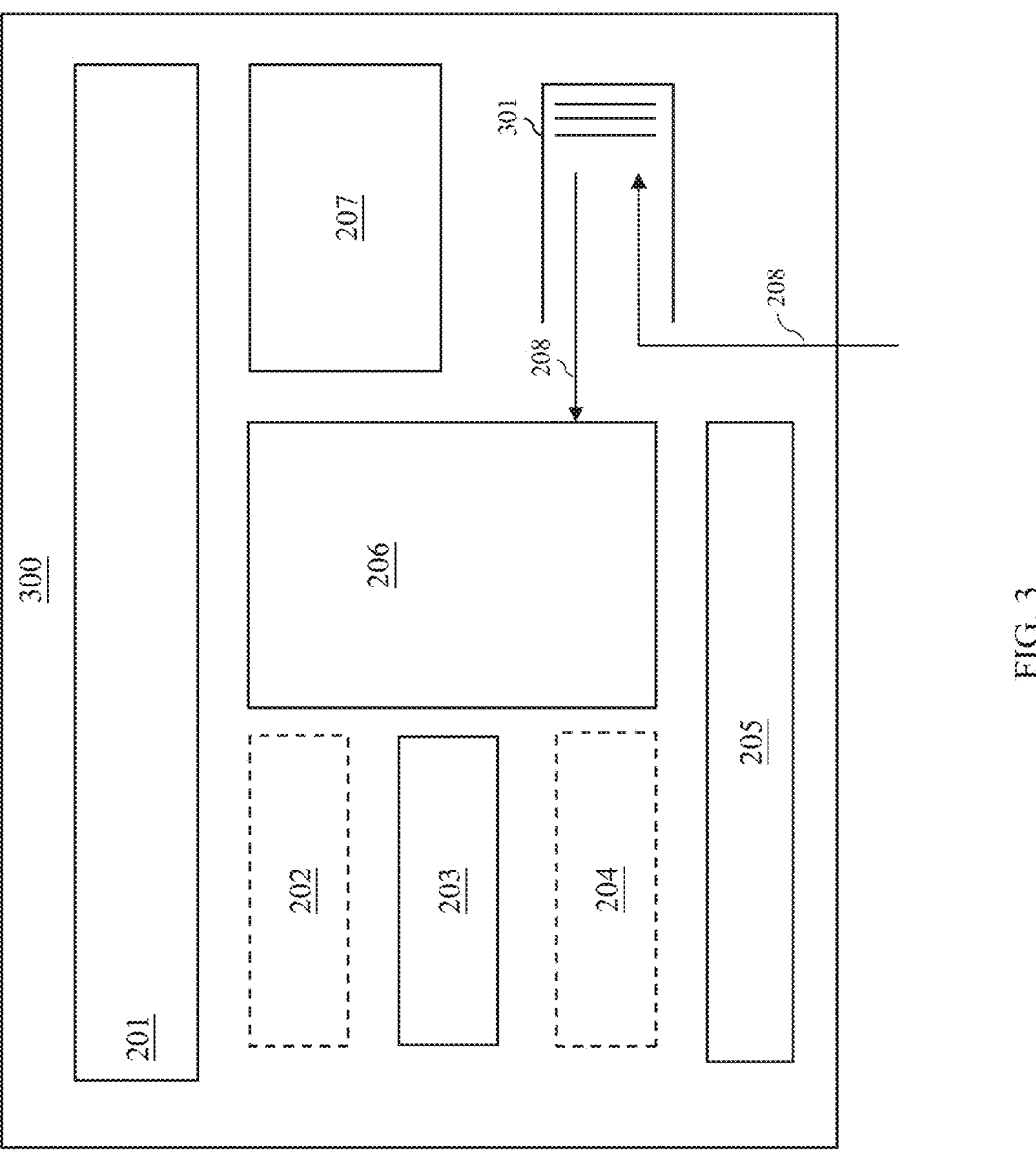
FIG. 3 shows another storage server according to the present disclosure.

FIG. 3 shows another storage server 300 according to the present disclosure. The storage server 300 is built based on the storage server 200 in FIG. 2 and also has the elements, functions, and features as mentioned for the storage server 200 in FIG. 2.

The storage server 300 in FIG. 3 may further comprise a queue, or a request queue 301. The request queue 301 may be used to cache the data request 208 after the data request 208 is received by the storage server 300. This is particularly beneficial when there are other data requests being processed by the storage server 300, or the storage server 300 is busy, because the data request 208 can be temporarily saved in the request queue 301 instead of being discarded immediately.

Optionally, when the data request 208 is temporarily saved in the request queue 301, the storage server 300 may be configured to pre-load the user-defined code 209 in the isolated execution environment 207. This may avoid waiting for a boot up time of the isolated execution environment 207, and the user-defined code can be executed timely after the data request 208 is retrieved. It is noted that although the data request 208 is temporarily saved in the request queue 301, the storage server 300 may still be able to obtain the user-defined code 209 indicated by or comprised in the data request 208, e.g., by simply parsing the second part of the data request 208.

The storage server 300 may be configured to pick up or retrieve the data request 208 for further processing, for example, when certain conditions are met. These conditions may include but are not limited to: there is at least one idle processor; there are enough resources (such as power, RAM, and processor cycles) to execute the data request 208 without affecting the execution of other tasks performed by the storage server 300, such as traditional storage requests and other data requests for near-data processing. Optionally, when there are multiple data requests in the request queue 301, the storage server 300 may be configured to decide which data request(s) to retrieve based on an estimation of resources to be consumed and/or execution duration. An algorithm, such as but not limited to a classical queue algorithm and a machine-learning based algorithm, may be used to decide which data request to retrieve next.

By comprising the request queue 301, performance isolation for already running tasks may be introduced. Thus, a promised service level agreement may be maintained, and denial of services in the data center may be avoided.

It is noted that some elements of FIG. 2, such as the optional load balancer, the user defined code 209, and the data flows 208, 210, 212, are not shown in FIG. 3 for reasons of simplicity. These omitted elements may still be applied to the storage server 300, unless specified otherwise. For example, the data request 208 in FIG. 3 is not directly fed into the storage software 206, but may be stored in the request queue 301.

Figure 4:
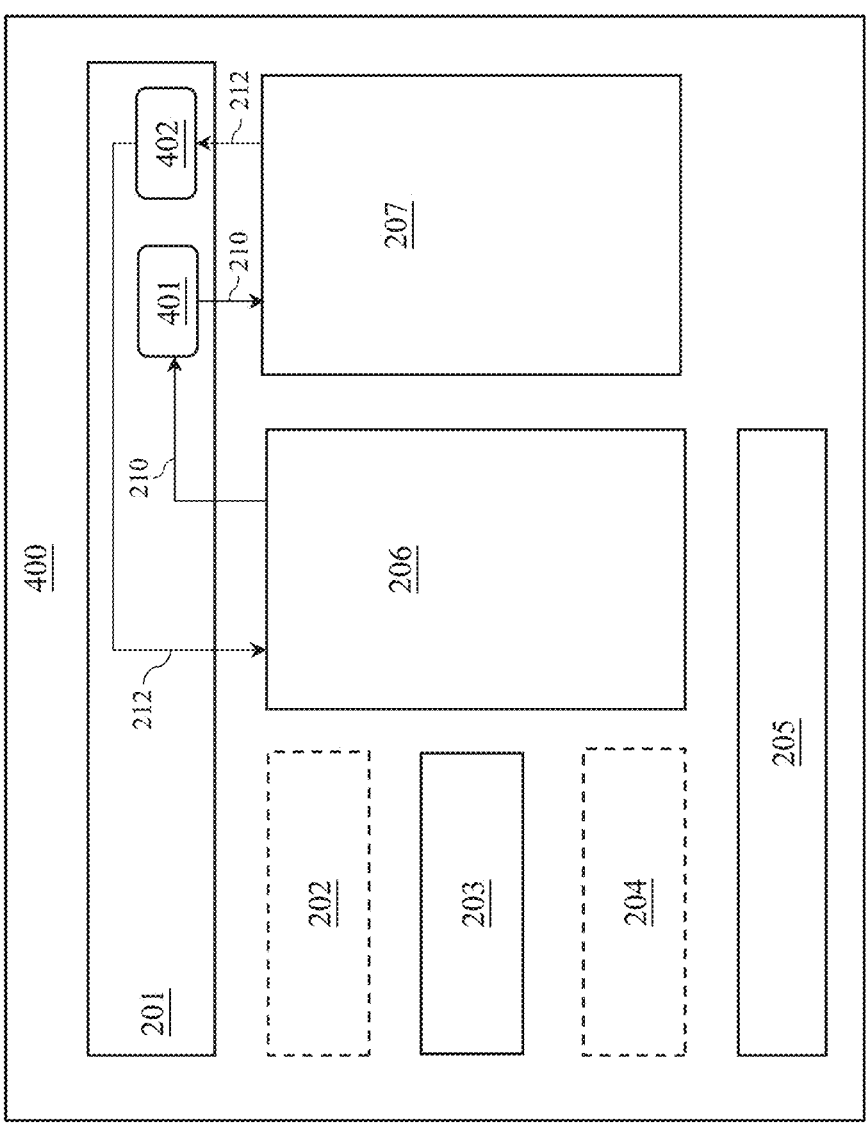
FIG. 4 shows another storage server according to the present disclosure.

FIG. 4 shows another storage server 400 according to the present disclosure. The storage server 400 is built based on the storage server 200 in FIG. 2, or the storage server 300 in FIG. 3, and may have the elements, functions, and features as mentioned for the storage server 200 in FIG. 2, or respectively the storage server 300 in FIG. 3.

The storage server 400 in FIG. 4 may be further configured to use a shared memory interprocess communication mechanism to enable communication between the storage software 206 and the user-defined code executed in the isolated execution environment 207. The storage software 206 may be further configured to store the obtained target data 210 into a first shared memory area 401 and collect the result 212 of executing the user-defined code from a second shared memory area 402.

In this way, operations such as data copy and transfer can be avoided inside the storage server 400. Therefore, the data processing speed can be further increased.

Optionally, the first shared memory area 401 may be configured to function as an input buffer, and the second shared memory area 402 may be configured to function as an output buffer. The input buffer may be configured to be read-only, and the output buffer may be configured to be write-only. In this way, any entities other than the storage software 206, such as the isolated execution environment 207, can only read from the input buffer, and can only write into the output buffer. Malicious operations such as side channels attacks, covert channel attacks, memory corruption attacks, can potentially be avoided. Hence, data leakage can be further avoided, and data security can be further increased for the storage server.

Optionally, when there is more than one isolated execution environment 207, 207', the storage server 400 may be configured to allocate shared memory areas across the multiple isolated execution environments 207, 207'. Alternatively, the storage server 400 may be configured to create a shared memory region for each isolated execution environment.

It is noted that elements of FIGS. 2 and 3, such as the load balancer for FIG. 2 and the request 301 shown in FIG. 3, are also compatible and combinable with the storage server 400 in FIG. 4. These omitted elements are not shown in FIG. 4 only for reasons of simplicity.

Figure 5:
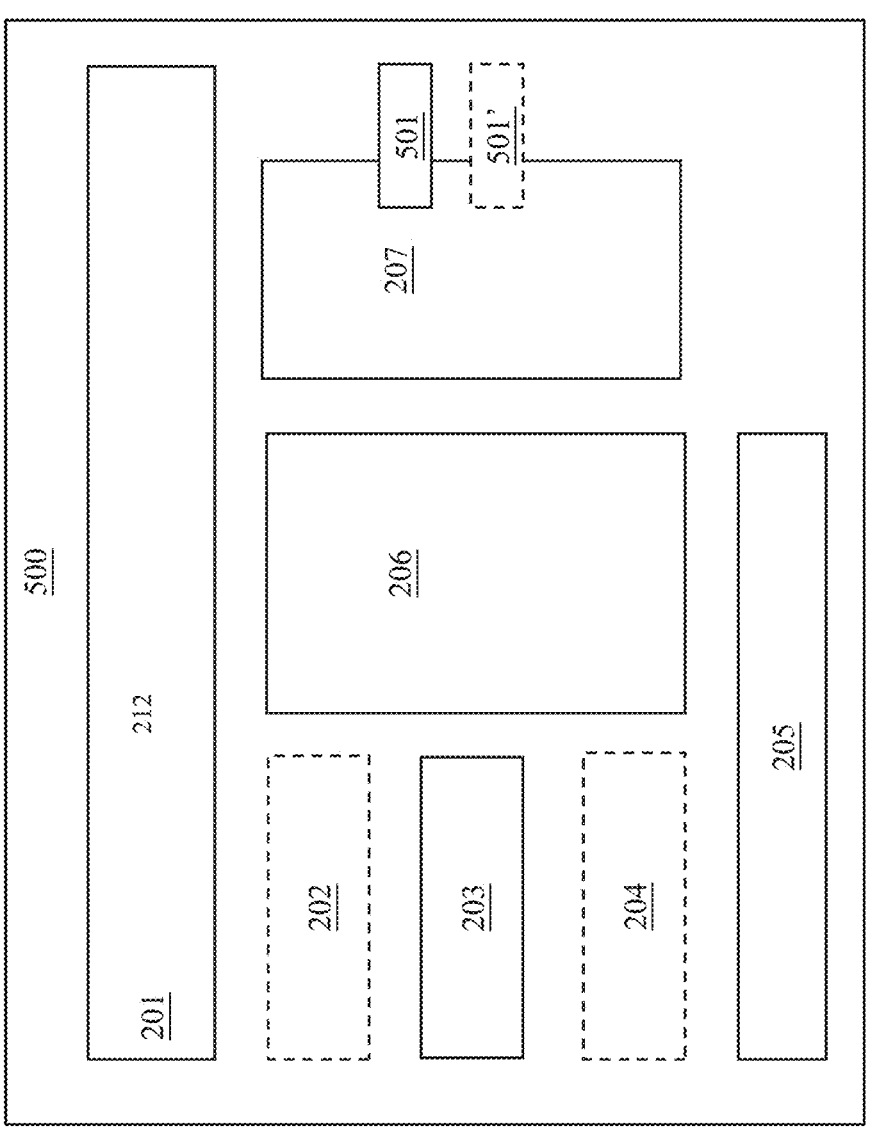
FIG. 5 shows another storage server according to the present disclosure.

FIG. 5 shows another storage server 500 according to the present disclosure. The storage server 500 may be built based on any one of the storage server 200-400 in FIGS. 2-4 and may have the elements, functions, and features as mentioned for any one of the storage server 200-400 in FIGS. 2-4.

The storage server 400 in FIG. 4 may further comprise one or more support components 501, 501'. Each support component 501 may be connected to the isolated execution environment or may be executed inside the isolated execution environment. Each support component 501 may comprise a runtime system and/or a library that is adapted to support the execution of the user-defined code 209.

Optionally, the user-defined code 209 may be in different forms including but not limited to a source code of any language, intermediate language, and executable binary.

Based on the type of the user-defined code, the support component 501 may comprise support elements, such as operating system, runtime system, configuration and libraries, to facilitate the execution of the user-defined code 209. In this way, the usability, compatibility and portability of the storage server, as well as of the data center may be improved.

It is noted that elements of FIG. 2-4 such as the load balancer for FIG. 2, the request 301 shown in FIG. 3, and the shared memory areas 401-402 shown in FIG. 4 are also compatible and combinable with the storage server 500 in FIG. 5. These omitted elements are not shown in FIG. 5 for reasons of simplicity.

Figure 6:
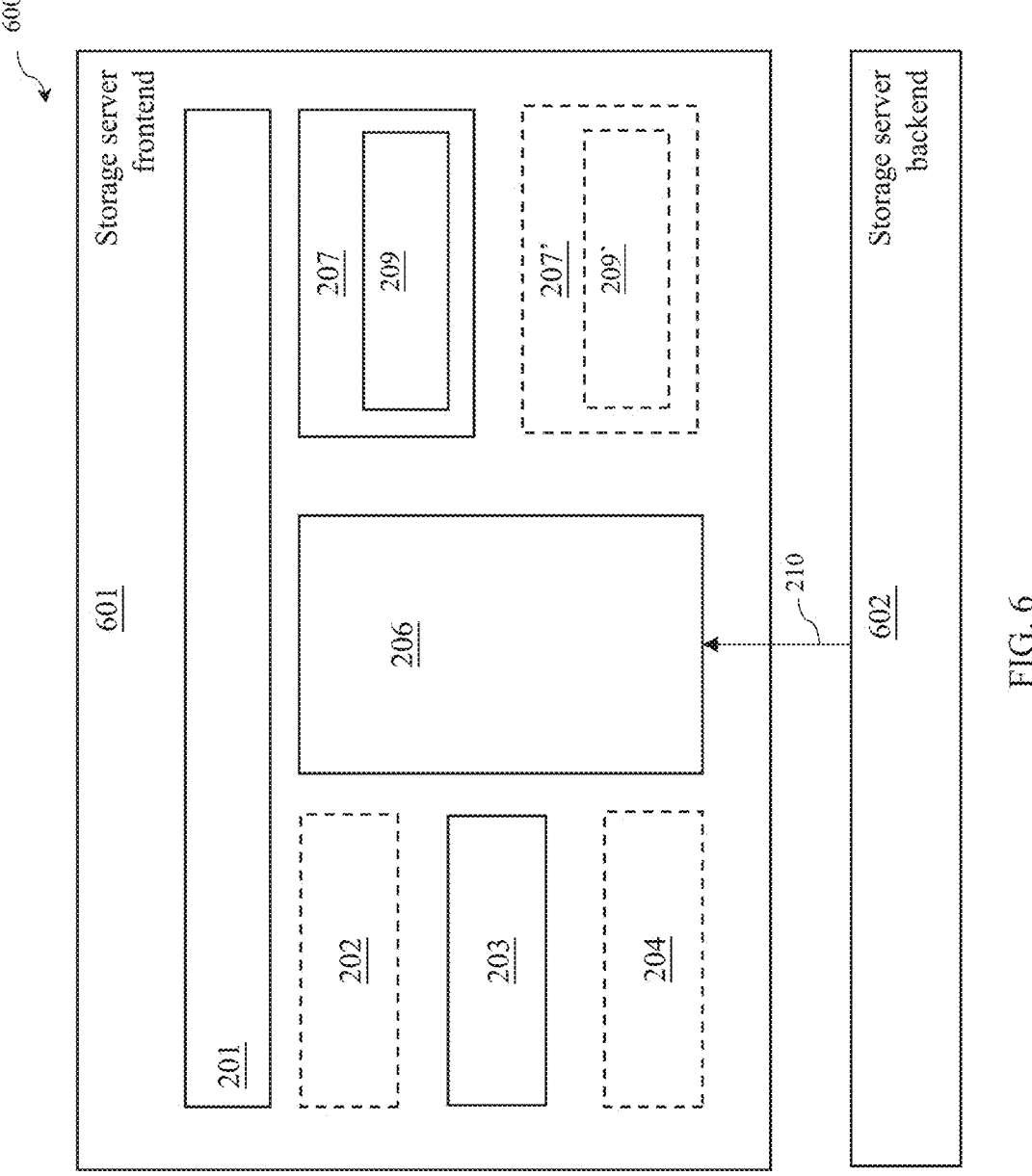
FIG. 6 shows another storage server according to the present disclosure.

FIG. 6 shows another storage server 600 according to the present disclosure. The storage server 600 may be built based on any one of the storage server 200-500 in FIGS. 2-5 and may have the elements, functions, and features as mentioned for any one of the storage server 200-500 in FIGS. 2-5.

The storage server 600 in FIG. 6 may comprise at least two parts: a storage server frontend 601 and a storage server backend 602.

The storage server frontend 601 may be adapted to focus on data processing, such as executing the user-defined code 209 on the target data 210. To this end, the storage server frontend 601 may comprise physical components such as the memory 201, the processing unit 203. The storage server frontend 601 may run the storage software 206 and the isolated execution environment 207.

The storage server backend 602 may be adapted to focus on data storage, such as storing and retrieving the target data 210, and storing the result 212. To this end, the storage server backend 602 may comprise the storage medium 205. Similarly, the storage medium 205 may comprise a hard disk (HDD), solid-state drive (SSD), and tape. The storage medium 205 may be organized in a form of disk array. Optionally, the storage server 600 may comprise more than one storage frontend 601. Optionally or additionally, the storage server 600 may comprise more than one storage server backend 602.

Optionally, the at least one storage server frontend 601 and the at least one storage server backend 602 may be connected through any suitable computer storage interface. The at least one storage server frontend 601 and the at least one storage server backend 602 may be connected in a wired network or wirelessly through a network such as InfiniBand, copper, optical technologies, Ethernet, local area network (LAN), wireless local area network (WLAN), and cellular network.

By splitting the storage server 600 into at least two parts, flexibility and scalability may be introduced for the storage server 600. For example, the storage server frontend 601 may be updated or replaced without affecting the storage server backend 602. The storage server backend 602 may be expanded without affecting the storage server frontend 601.

It is noted that elements of FIG. 2-5 such as the load balancer for FIG. 2, the request 301 shown in FIG. 3, the shared memory areas 401-402 shown in FIG. 4, and the support component 501 shown in FIG. 5 are also compatible and combinable with the storage server 600 in FIG. 6. These omitted elements are not shown in FIG. 6 for reasons of simplicity.

Figure 7B:
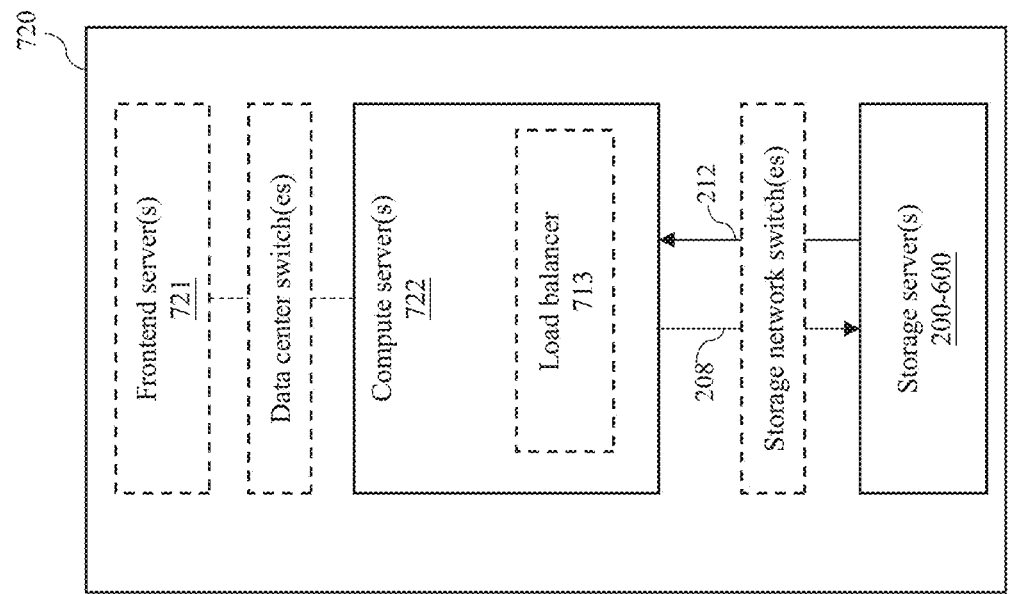
FIG. 7B shows another system according to the present disclosure.
Figure 7A:
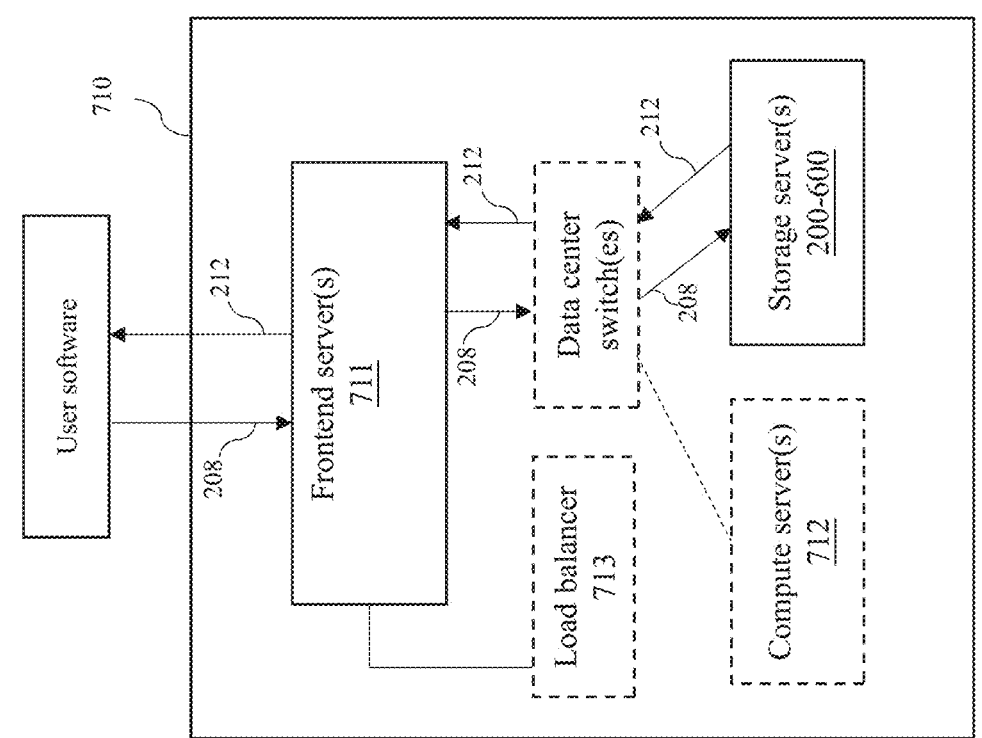
FIG. 7A shows a system according to the present disclosure.

FIG. 7A shows an example of a system 710 according to the present disclosure.

The system 710 depicted in FIG. 7A comprises at least one frontend server 711 and at least one storage server. The storage server may be built based on any one of the storage servers 200-600 in FIGS. 2-6. The frontend server 711 may be configured to obtain the data request 208 from outside the system 710. Then, the frontend server 711 may be configured to forward the data request 208 to the storage server directly, or through a network such as a data center switch.

Optionally, the system 710 may further comprise a load balancer 713. The load balancer 713 may be connected to the frontend server as shown in FIG. 7A. Alternatively, the load balancer 713 may be part of the frontend server (not shown in FIG. 7A). The load balancer 713 may share the same functions and features as described for the load balancer for FIG. 2.

Optionally, the system 710 may further comprise at least one compute server 712.

FIG. 7B shows another example of a system 720 according to the present disclosure.

The system 720 depicted in FIG. 7B comprises at least one compute server 722 and at least one storage server. The storage server may be built based on any one of the storage servers 200-600 in FIGS. 2-6. The compute server 722 may be configured to generate the data request 208 and send the data request 208 to the storage server directly, or through a network such as a storage network switch.

Optionally, the system 720 may further comprise a load balancer 713. The load balancer 713 may be connected to the compute server (not shown in FIG. 7B). Alternatively, the load balancer 713 may be part of the compute server as shown in FIG. 7B. The load balancer 713 may share the same functions and features as described for the load balancer for FIG. 2.

Optionally, the system 720 may further comprise at least one frontend server 721.

In the system 710 or 720, an interface may be defined and used to submit a request to a storage layer (e.g., the at least one storage server). At least three general categories may be defined for processing the target data: augmented read, augmented write, and augmented transform. The augmented read may refer to a process of executing the user-defined code on the target data already stored inside the storage layer and outputting the result to the originator of the data request. The augmented write may refer to a process of executing the user-defined code on target data to be written into the storage layer. The argument transform may refer to a process of executing the user-defined code on the target data already stored inside the storage layer and storing the result into the storage layer.

Optionally, a series of library calls such as invoke ( ), invoke_get ( ), or invoke_read ( ) may be defined and used to specify both the target data and the user-defined code. For example, a representational state transfer (REST) protocol may be used for the data center. User software may generate the data request using the series of library calls. Then, the data request may be transformed into one or more REST calls that can be handled by the storage software 206 of the storage server.

It is noted that the compute server 722 in FIG. 7B may be compatible in the system 710 in FIG. 7A. That is, the compute server 712 in FIG. 7A may be replaced by the compute server 722 in FIG. 7B. Similarly, the frontend server 711 in FIG. 7A may be compatible in the system 720 in FIG. 7B. That is, the frontend server 721 in FIG. 7B may be replaced by the frontend server 711 in FIG. 7A. The load balancer 713 between FIG. 7A and 7B may also be compatible and switchable. That is, the load balancer 713 in FIG. 7B may alternatively be a standalone server connected to the compute server 722; the load balancer 713 in FIG. 7A may alternatively be comprised inside the frontend server 711.

In general, it is sufficient in the present disclosure that at least one of the frontend server and the compute server is configured to send the data request 208 to the storage server.

Figure 8:
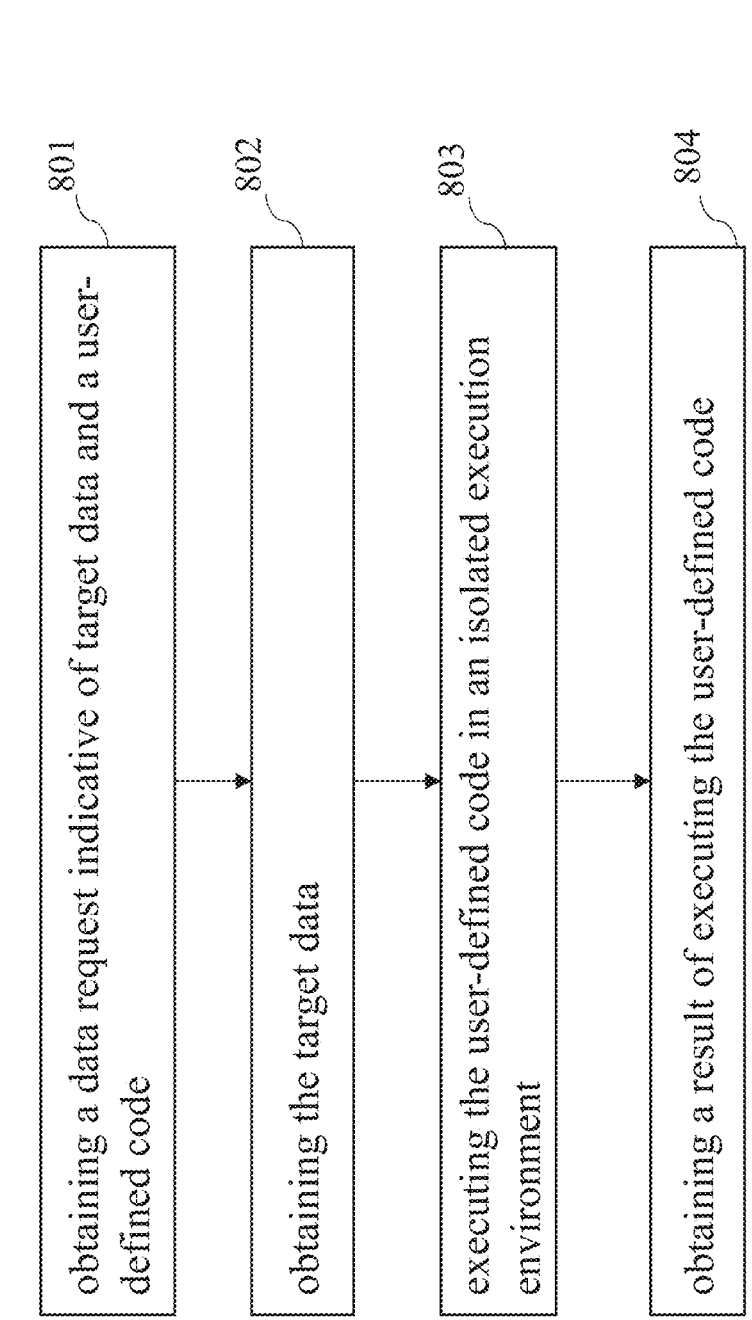
FIG. 8 shows a method according to the present disclosure.

FIG. 8 shows a diagram of a method 800 according to the present disclosure.

The method 800 is executed by a storage server according to any one of the storage server 200-600 in FIGS. 2-6. The method 800 comprises the following steps:

step 801: obtaining a data request, wherein the data request is indicative of target data and a user-defined code;

step 802: obtaining the target data by using a storage software of the storage server;

step 803: executing the user-defined code in an isolated execution environment using the target data as an input, wherein the execution environment is separated from the storage software; and step 804: obtaining a result of executing the user-defined code as an output related to the data request.

Optionally, the steps of the method 800 may share the same functions and details from the perspective of the storage server shown in the FIGS. 2-6 described above. Therefore, the corresponding method implementations are not described again at this point.

Figure 9:
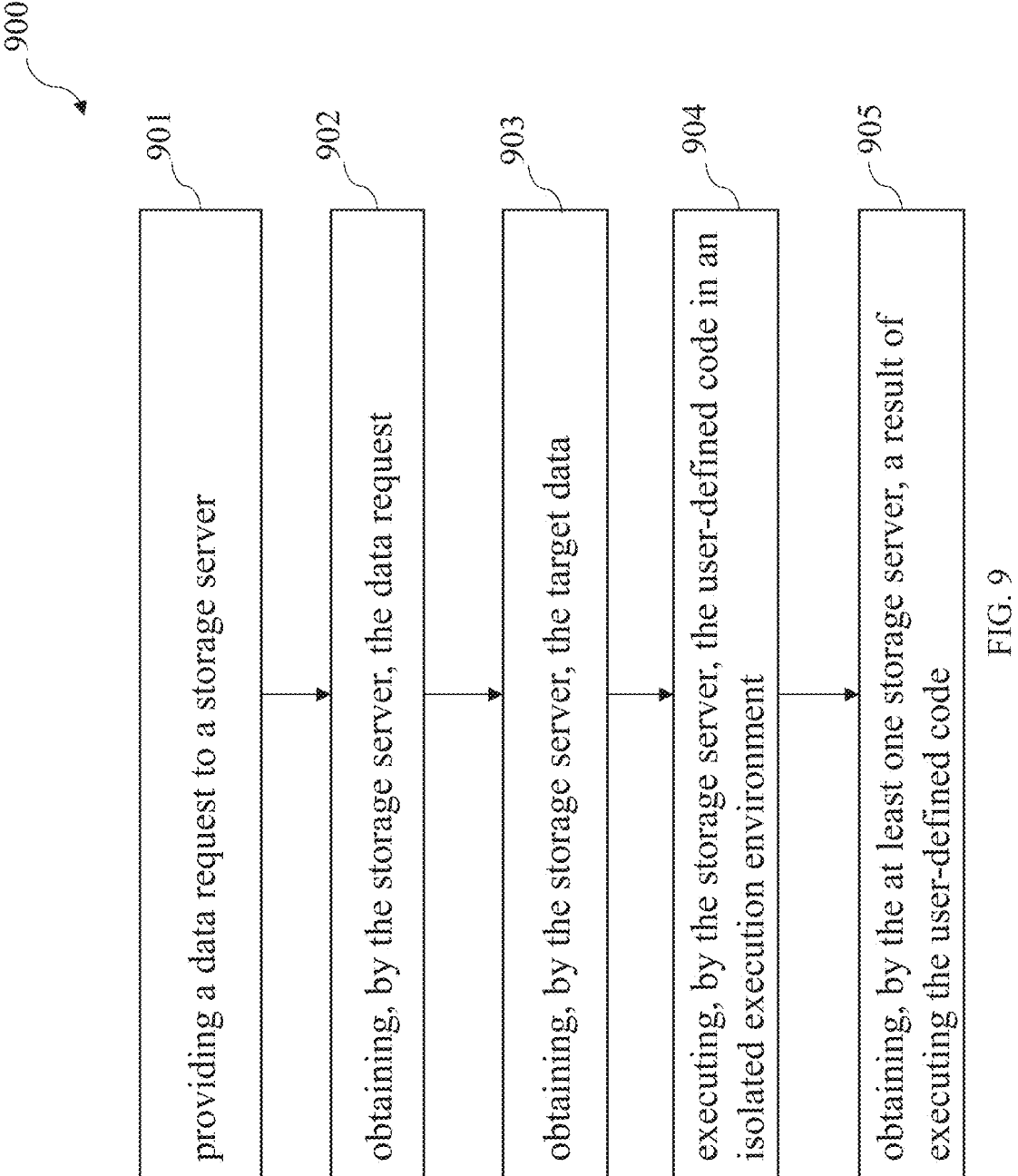
FIG. 9 shows another method according to the present disclosure.

FIG. 9 shows a diagram of another method 900 according to the present disclosure.

The method 900 applies to a system comprising at least one storage server and at least one of a compute server and a frontend server. The method 900 comprises the following steps:

step 901: providing, by the at least one of the compute server and the frontend server, a data request to the at least one storage server;

step 902: obtaining, by the at least one storage server, the data request, wherein the data request is indicative of target data and a user-defined code;

step 903: obtaining, by the at least one storage server, the target data by using a storage software of the at least one storage server; and step 904: executing, by the at least one storage server, the user-defined code in an isolated execution environment using the target data as an input, wherein the execution environment is separated from the storage software; and step 905: obtaining, by the at least one storage server, a result of executing the user-defined code as an output related to the data request.

Optionally, the steps of the method 900 may share the same functions and details from the perspective of the system shown in the FIGS. 2-7 described above. Therefore, the corresponding method implementations are not described again at this point.

Figure 10:
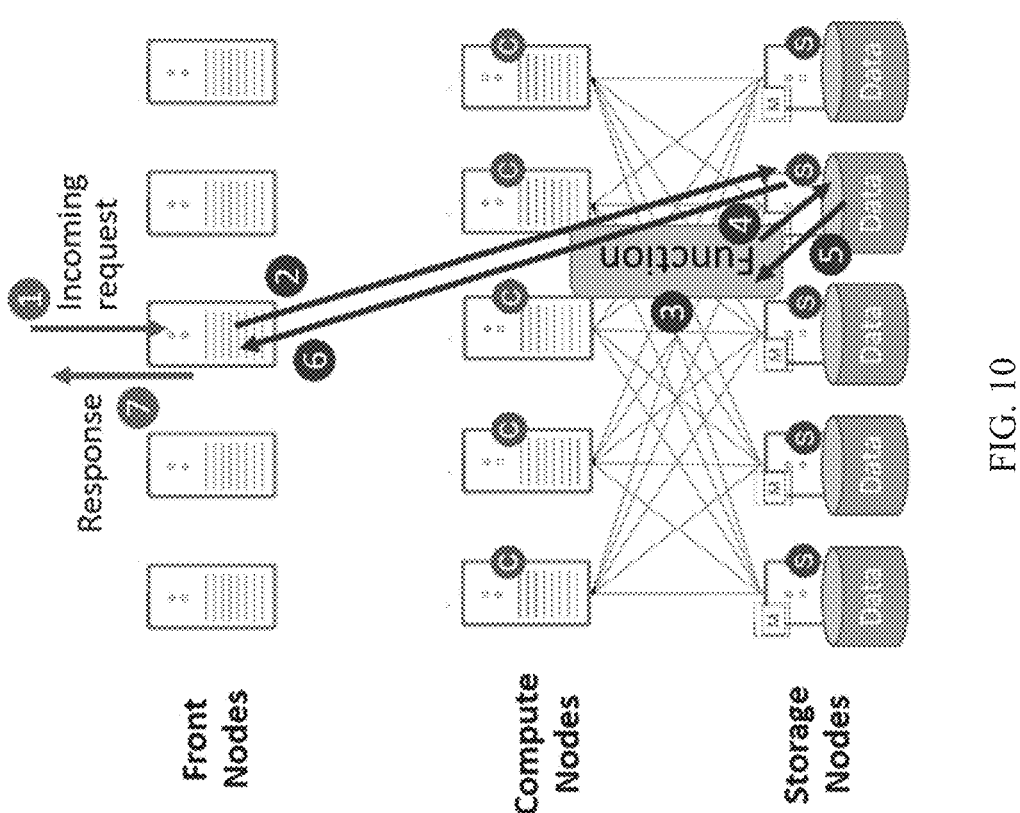
FIG. 10 shows an application scenario of the present disclosure.

FIG. 10 illustrates an application scenario of the present disclosure, wherein Function as a Service (FaaS) is deployed in a data center. Numbers of 1-7 in FIG. 10 represent the sequence of data flows among front nodes (i.e., frontend servers), compute nodes (C) and storage nodes (S) in the data center.

In FaaS setups, a user-defined code may comprise one or more programming language procedures and/or functions. Optionally, an entry point, which is the first procedure or function to be executed, may be comprised therein. Different implementations of FaaS support different programming languages. Based on the programming language, the procedures and/or functions may be compiled into either native code or intermediate code. Alternatively, they can be kept as a source code. For example, a Python code may be kept as source code and are still executable; a Java code may be compiled into intermediate code: a C/C++ code may be natively compiled. Optionally, based on the programming language, said procedures and/or functions need a runtime to execute, which is not provided within user-defined code. Instead, it is provided by the FaaS runtime system. The FaaS runtime system may include systems services, systems libraries, and an actual language runtime system for said procedures and/or functions that are not natively compiled. Optionally, a FaaS runtime system may include an operating system.

According to the present disclosure, the FaaS runtime system can be embedded into an isolated execution environment like a sandbox on the storage node(s).

The FaaS runtime system may be configured to support a new event triggered by the data request. The data request can be augmented read, write, or transform requests, and carries over the user-defined code, or a URL that refers to that.

Optionally, the target data of the augmented read and transform request may come from the storage layer, while the target data of the augmented write request may come from the user (not from the storage layer). For the augmented read request, the result may be sent to the user. For the transform request or the write request, the result may be sent to the storage layer.

Optionally, if the user-defined code is provided as a URL, such user-defined code may be stored somewhere in the storage layer itself, or on the Internet, before it is referenced or used. For obtaining the user-defined code, the storage node may be configured to retrieve and upload the user-defined code to the isolated execution environment. Optionally, the storage node may be configured to check the legitimacy and the format of the user-defined code. Pre-checking may help in different ways, such as making sure that the provided procedure of function is legit.

Optionally, the FaaS runtime system may be adapted to support the optional shared memory interprocess communication mechanism as mentioned above.

Another application scenario of the present disclosure is to deploy a database (or datastore) system in a data center. Databases like SQL software (e.g., MySQL), or datastores like NoSQL software (e.g., Spark), may allow user-defined functions or UDFs. However, the supported UDFs are normally limited in terms of format, functionality, and programming languages.

The present disclosure may help the databases or datastores to support UDFs that run outside the database or datastore software itself, albeit on the same machine, i.e., the storage server. Hence, in the present disclosure, a UDF could be defined in any programming language.

It is noted that any the storage server of the present disclosure (as described above) may comprise processing circuitry configured to perform, conduct or initiate the various operations of the device described herein, respectively. The processing circuitry may comprise hardware and software. The hardware may comprise analog circuitry or digital circuitry, or both analog and digital circuitry. The digital circuitry may comprise components such as application-specific integrated circuits (ASICs), field-programmable arrays (FPGAs), digital signal processors (DSPs), or multi-purpose processors. In one embodiment, the processing circuitry comprises one or more processors and a non-transitory memory connected to the one or more processors. The non-transitory memory may carry executable program code which, when executed by the one or more processors, causes the device to perform, conduct or initiate the operations or methods described herein, respectively.

It is further noted that the storage server of the present disclosure may be a single electronic device or apparatus capable of computing, or may comprise a set of connected electronic devices or modules capable of computing with shared system memory. It is well-known in the art that such computing capabilities may be incorporated into many different devices or modules, and therefore the term "device" or "apparatus" may comprise a chip, chipset, computer, server and the like.

The present disclosure has been described in conjunction with various embodiments as examples as well as implementations. However, other variations can be understood and effected by those persons skilled in the art and practicing the claimed subject matter, from the studies of the drawings, this disclosure and the independent claims. In the claims as well as in the description the word "comprising" does not exclude other elements or steps and the indefinite article "a" or "an" does not exclude a plurality. For example, the user-defined code indicated by the data request may comprise a series of executable binaries and/or commands. A single element or another unit may fulfill the functions of several entities or items recited in the claims. The mere fact that certain measures are recited in the mutual different dependent claims does not indicate that a combination of these measures cannot be used in an advantageous implementation.

What is claimed is:

1. A storage server for a data center, the storage server comprising:
   a storage medium storing processor-executable instructions;
   at least one processor, coupled to the storage medium and configured to execute the processor-executable instructions to cause the storage server to:
   obtain a data request, which indicates target data and a user-defined code;
   obtain the target data by using a storage software of the storage server;
   execute the user-defined code in an isolated execution environment using the target data as an input, wherein the isolated execution environment is separated from the storage software;
   obtain a result of executing the user-defined code as an output related to the data request;
   wherein for executing the user-defined code, the storage server is configured to:
   determine one or more idle processors among the at least one processor of the storage server;
   execute the user-defined code by using the one or more idle processors; and
   wherein before determining the one or more idle processors, the storage server is configured to store the data request in a queue, and during or after determining the one or more idle processors, the storage server is configured to pick up the data request from the queue.

2. The storage server according to claim 1, further configured to use a shared memory interprocess communication mechanism to communicate between the storage software and the user-defined code executed in the isolated execution environment, and the storage server is configured to execute the storage software to:
   store the obtained target data into a first shared memory area; and
   obtain the result of executing the user-defined code from a second shared memory area.

3. The storage server according to claim 2, wherein the first shared memory area comprises an input buffer, and the second shared memory area comprises an output buffer, wherein the input buffer is configured to be read-only, and the output buffer is configured to be write-only.

4. The storage server according to claim 1, further comprising one or more support components, wherein each support component is associated with the isolated execution environment and comprises at least one of an operating system, a runtime system, and a library that is adapted to support the execution of the user-defined code.

5. The storage server according to claim 1, further configured to:
   create a checkpoint or an image of the isolated execution environment.

6. The storage server according to claim 1, wherein the isolated execution environment is based on a virtual machine or container.

7. A system comprising at least one storage server according to claim 1, wherein the system further comprises at least one of a compute server and/or at least one of a frontend server, wherein the at least one of the compute server and/or at least one of the frontend server is configured to provide the data request to the at least one storage server.

8. The system according to claim 7, wherein the system comprises the at least one frontend server configured to:
   obtain the data request from outside of the system; and
   forward the data request to the at least one storage server.

9. The system according to claim 7, wherein the system comprises the at least one compute server configured to:
   generate the data request; and
   forward the data request to the at least one storage server.

10. The system according to claim 7, wherein the at least one of the compute server and/or at least one of the frontend server is configured to:
    monitor a status of each storage server; and
    provide the data request to a storage server selected based on the monitored status.

11. The system according to claim 10, wherein the at least one of the compute server and/or at least one of the frontend server is further configured to:
    split the data request into a plurality of sub-requests, and
    provide the plurality of sub-requests to one or more storage servers of the at least one storage server selected based on the monitored status.

12. A method executed by at least one storage server for a data center, the method comprising:
    obtaining a data request, which indicates target data and a user-defined code;
    obtaining the target data by using a storage software of the at least one storage server;
    executing the user-defined code in an isolated execution environment using the target data as an input, wherein the execution environment is separated from the storage software;
    obtaining a result of executing the user-defined code as an output related to the data request;
    wherein the executing the user-defined code further comprises:
    determining one or more idle processors among at least one processor of the at least one storage server;
    executing the user-defined code by using the one or more idle processors; and
    wherein before determining the one or more idle processors, the method further comprises storing the data request in a queue, and during or after determining the one or more idle processors, the method further comprises picking up the data request from the queue.

13. A method for a system, wherein the system comprise at least one storage server and at least one of a compute server and a frontend server, wherein the at least one of the compute server and the frontend server is connected to the at least one storage server, and the method comprises:

providing, by the at least one of the compute server and the frontend server, a data request to the at least one storage server;

obtaining, by the at least one storage server, the data request, which indicates target data and a user-defined code;

obtaining the target data by using a storage software of the at least one storage server;

executing, by the at least one storage server, the user-defined code in an isolated execution environment using the target data as an input, wherein the execution environment is separated from the storage software;

obtaining, by the at least one storage server, a result of executing the user-defined code as an output related to the data request;

wherein the executing the user-defined code further comprises:

determining one or more idle processors among at least one processor of the at least one storage server;

executing the user-defined code by using the one or more idle processors; and wherein before determining the one or more idle processors, the method further comprises storing the data request in a queue, and during or after determining the one or more idle processors, the method further comprises picking up the data request from the queue.

14. The method according to claim 12, further comprising:

using, by the at least one storage server, a shared memory interprocess communication mechanism to communicate between the storage software and the user-defined code executed in the isolated execution environment, storing, by the at least one storage server executing the storage software, the obtained target data into a first shared memory area; and obtaining, by the at least one storage server executing the storage software, the result of executing the user-defined code from a second shared memory area.

15. The method according to claim 14, wherein the first shared memory area comprises an input buffer, and the second shared memory area comprises an output buffer, wherein the input buffer is configured to be read-only, and the output buffer is configured to be write-only.

16. The method according to claim 12, wherein the at least one storage server further comprises one or more support components, wherein each support component is associated with the isolated execution environment and comprises at least one of an operating system, a runtime system, and a library that is adapted to support the execution of the user-defined code.

17. The method according to claim 12, further comprising:

creating a checkpoint or an image of the isolated execution environment.

18. The method according to claim 12, wherein the isolated execution environment is based on a virtual machine or container.

19. The method according to claim 13, further comprising:

using, by the at least one storage server, a shared memory interprocess communication mechanism to communicate between the storage software and the user-defined code executed in the isolated execution environment, storing, by the at least one storage server executing the storage software, the obtained target data into a first shared memory area; and obtaining, by the at least one storage server executing the storage software, the result of executing the user-defined code from a second shared memory area.

20. The method according to claim 19, wherein the first shared memory area comprises an input buffer, and the second shared memory area comprises an output buffer, wherein the input buffer is configured to be read-only, and the output buffer is configured to be write-only.

\* \* \* \* \*